(12) United States Patent
Krause et al.

(10) Patent No.: US 7,494,718 B2
(45) Date of Patent: *Feb. 24, 2009

(54) METHOD FOR IMPROVING THE SURFACE HARDNESS OF A WOODEN BODY USING AN AQUEOUS SOLUTION OF AN IMPREGNATING AGENT

(75) Inventors: Andreas Krause, Goettingen (DE); Holger Militz, Bovenden (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 374 days.

This patent is subject to a terminal disclaimer.

(21) Appl. No.: 10/529,902

(22) PCT Filed: Oct. 1, 2003

(86) PCT No.: PCT/EP03/10875

§ 371 (c)(1),
(2), (4) Date: Apr. 1, 2005

(87) PCT Pub. No.: WO2004/033171

PCT Pub. Date: Apr. 22, 2004

(65) Prior Publication Data

US 2006/0051607 A1    Mar. 9, 2006

(30) Foreign Application Priority Data

Oct. 4, 2002    (DE)    ................................ 102 46 400

(51) Int. Cl.
*B32B 23/04*    (2006.01)

(52) U.S. Cl. ........................ 428/532; 428/533; 428/535; 428/536; 428/537.1; 427/440; 422/32; 524/391; 524/597; 528/254; 528/259

(58) Field of Classification Search ................ 428/532, 428/533, 535, 536, 537.1; 427/440; 422/32; 524/391, 597; 528/254, 259
See application file for complete search history.

(56) References Cited

U.S. PATENT DOCUMENTS

| 4,005,039 | A | * | 1/1977 | Gardiner | ..................... 524/391 |
| 4,396,391 | A | * | 8/1983 | North | ............................. 8/181 |
| 4,908,238 | A | | 3/1990 | Vigo et al. | |
| 5,384,012 | A | | 1/1995 | Hazard, Jr. | |
| 6,265,589 | B1 | | 7/2001 | Lippert et al. | |
| 2006/0051607 | A1 | | 3/2006 | Krause et al. | |

FOREIGN PATENT DOCUMENTS

| SE | 500 039 | 3/1994 |
| WO | 97/36720 | 10/1997 |

OTHER PUBLICATIONS

Militz, H., "Treatment of timber with water soluble dimethylol resins to improve their dimensional stability and durability" Wood Science and Technology, vol. 27, pp. 347-355, 1993.
W.D. Ellis, J.L. O'dell, "Wood-Polymer Composites Made with Acrylic Monomers, Isocyanate and Maleic Anhydride", Journal of Applied Polymer Science, vol. 73, pp. 2493-2505, 1999.
U.S. Appl. No. 12/088,702, filed Mar. 31, 2008, Kingma et al.
U.S. Appl. No. 12/089,209, filed Apr. 4, 2008, Kingma et al.

* cited by examiner

*Primary Examiner*—Leszek Kiliman
(74) *Attorney, Agent, or Firm*—Oblon, Spivak, McClelland, Maier & Neustadt, P.C.

(57) ABSTRACT

A process for the production of a wood body having increased surface hardness, in which an untreated wood body is impregnated with an aqueous solution of A) an impregnating agent consisting of a 1,3-bis(hydroxymethyl)-4,5-dihydroxyimidazolidin-2-one modified with a $C_{1-5}$-alcohol, a polyol or mixtures thereof, and B) a catalyst from the group consisting of ammonium or metal salts, organic or inorganic acids or mixtures thereof, dried and then hardened at elevated temperature is described.

24 Claims, No Drawings

METHOD FOR IMPROVING THE SURFACE HARDNESS OF A WOODEN BODY USING AN AQUEOUS SOLUTION OF AN IMPREGNATING AGENT

The invention relates to a process for the production of a wood body having increased surface hardness and low formaldehyde emission, characterized in that an untreated wood body is impregnated with an aqueous solution of A) an impregnating agent consisting of a 1,3-bis(hydroxymethyl)-4,5-dihydroxyimidazolidin-2-one modified with a $C_{1-5}$-alcohol, a polyol or mixtures thereof, and B) a catalyst from the group consisting of ammonium or metal salts, organic or inorganic acids or mixtures thereof, dried and then cured at elevated temperature.

A wood body is understood as meaning a shaped body of solid wood, including veneers. From the wood body and the impregnating agent, it is intended to form, so to speak, a composite material in which the positive properties of the natural material wood, in particular the appearance, are retained but one or more physical properties are substantially improved. This relates in particular to the surface hardness.

From the publication "Treatment of timber with water soluble dimethylol resins to improve the dimensional stability and durability", in Wood Science and Technology 1993, pages 347-355, it is known that the shrinkage and swelling properties of wood and the resistance to fungi and insects can be improved by treating the wood with an impregnating agent which consists of an aqueous solution of dimethyloldihydroxyethyleneurea (DMDHEU or 1,3-bis(hydroxymethyl)-4,5-dihydroxyimidazolidin-2-one) and a catalyst. Catalysts used are metal salts, citric acid and amine salts, individually or in combination. The DMDHEU is used in the aqueous solution in concentrations of from 5% to 20%. The added amount of catalyst is 20%, based on the DMDHEU. The impregnation is effected under reduced pressure. At elevated temperature, a reaction of the DMDHEU with itself and with the wood takes place. This reaction takes place in the course of one hour in a drying oven at temperatures of 80° C. or 100° C. The wood samples thus treated exhibit an improvement of up to 75% in the shrinkage and swelling properties, and do so at DMDHEU concentrations of 20%. Wood bodies having dimensions of 20 mm×20 mm×10 mm were investigated in this manner. The process described can be used only in the case of small dimensions of the wood bodies because the timbers treated tend to crack in the case of larger dimensions.

From the publication by W. D. Ellis, J. L. O'Dell, "Wood-Polymer Composites Made with Acrylic Monomers, Isocyanate and Maleic Anhydride", published in Journal of Applied Polymer Science, Vol. 73, pages 2493-2505 (1999), it is known that natural wood can be treated with a mixture of acrylates, isocyanate and maleic anhydride under reduced pressure. The substances used react with themselves but not with the wood. By means of such an impregnation, the density, the hardness and the resistance to water vapor diffusion increase. Furthermore, the water repellency and the dimensional stability of the wood are improved.

EP-B 0 891 244 discloses the impregnation of wood bodies of solid wood with a biodegradable polymer, a natural resin and/or a fatty ester—if appropriate with the application of reduced pressure and/or superatmospheric pressure. The impregnation is effected at elevated temperatures. The pores in the wood are at least substantially filled, and a shaped body which contains both wood and biodegradable polymer forms. A reaction of the polymer with the wood does not take place. The characteristic properties of wood, the biodegradability and the mechanical properties are not lost with this treatment. The thermoplasticity can be increased. Depending on the proportion of polymer introduced, there is an increase in the surface hardness due to the incorporation of the polymer into the wood matrix, so that timbers naturally soft are also suitable for high-quality floors.

SE-C 500 039 describes a process for hardening wood with compression, in which untreated wood is impregnated with various aminoplast monomers based on melamine and formaldehyde by means of vacuum pressure impregnation, then dried, and hardened in a press with compression at elevated temperature. Inter alia, DMDHEU, dimethylolurea, dimethoxymethylurea, dimethylolethyleneurea, dimethylolpropyleneurea and dimethoxymethylurone are mentioned as crosslinking agents.

This process has the disadvantage that the natural wood structure is lost as a result of the compression, and the formaldehyde emission of the completed wood body is relatively high, depending on the crosslinking agent used.

It was the object of the invention to provide a process for improving the surface hardness of a wood body also with relatively large dimensions, which process does not have the disadvantages of the prior art, in particular does not lead to cracking in the wood, leads to low formaldehyde emissions in the wood body and gives wood bodies in which the natural wood structure is preserved. This results in various advantageous potential applications for the wood body, in particular use as parquet.

The object of the invention was achieved, according to the invention, by the process described at the outset.

A suitable impregnating agent A) for wood bodies is a 1,3-bis(hydroxymethyl)-4,5-dihydroxyimidazolidin-2-one modified with a $C_{1-5}$-alcohol, a polyol or mixtures thereof. Modified 1,3-bis(hydroxymethyl)-4,5-dihydroxyimidazolidin-2-one (mDMDHEU) is disclosed, for example, in U.S. Pat. No. 4,396,391 and WO 98/29393. These are reaction products of 1,3-bis(hydroxymethyl)-4,5-dihydroxyimidazolidin-2-one with a $C_{1-5}$-alcohol, a polyol or mixtures thereof.

Suitable $C_{1-5}$-alcohols are, for example, methanol, ethanol, n-propanol, isopropanol, n-butanol and n-pentanol, methanol being preferred.

Suitable polyols are ethylene glycol, diethylene glycol, 1,2- and 1,3-propylene glycol, 1,2-, 1,3- and 1,4-butylene glycol, glycerol and polyethylene glycol of the formula $HO(CH_2CH_2O)_nH$, where n is from 3 to 20, diethylene glycol being preferred.

For modification of the 1,3-bis(hydroxymethyl)-4,5-dihydroxyimidazolidin-2-one (mDMDHEU), DMDHEU and the monohydric alcohol and/or the polyol are mixed, the monohydric alcohol and/or the polyol each being used in an amount of from 0.1 to 2.0 mole equivalents, based on DMDHEU. The mixture of DMDHEU, monohydric alcohol and/or polyol is reacted at temperatures of from 20 to 70° C. and a pH of from 1 to 2.5, the pH being brought to 4 to 8 after the reaction.

Suitable impregnating agents (C) are 1,3-bis(hydroxymethyl)-4,5-dihydroxyimidazolidin-2-one, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea or mixtures thereof. 1,3-Bis(hydroxymethyl)-4,5-dihydroxyimidazolidin-2-one is preferred.

Suitable impregnating agents D) are $C_{1-5}$-alcohols, polyols or mixtures thereof, such as, for example, methanol, ethanol, n-propanol, isopropanol, n-butanol, n-pentanol, ethylene glycol, diethylene glycol, 1,2- and 1,3-propylene glycol, 1,2-, 1,3-, and 1,4-butylene glycol, glycerol, polyethylene glycols of the formula $HO(CH_2CH_2O)_nH$, where n is from 3 to 20, or mixtures thereof.

Methanol, diethylene glycol or mixtures thereof are preferred.

The impregnating agent A) and, if appropriate, C) and D) are used in a concentration of from 1 to 60% by weight, preferably from 10 to 50% by weight, based on the aqueous solution of the impregnating agent.

If the impregnating agent C) is concomitantly used, from 1 to 60% by weight, based on the impregnating agent A), is preferred.

If the impregnating agent D) is concomitantly used, from 1 to 40% by weight, based on the impregnating agent A), is preferred.

Suitable catalysts B) are metal salts from the group consisting of metal halides, metal sulfates, metal nitrates, metal tetrafluoroborates, metal phosphates or mixtures thereof. Examples are magnesium chloride, magnesium sulfate, zinc chloride, lithium chloride, lithium bromide, boron trifluoride, aluminum chloride, aluminum sulfate, zinc nitrate, sodium tetrafluoroborate or mixtures thereof.

Suitable catalysts B) are also ammonium salts from the group consisting of ammonium chloride, ammonium sulfate, ammonium oxalate, diammonium phosphate or mixtures thereof.

Further suitable catalysts B) are organic or inorganic acids. Suitable examples are maleic acid, formic acid, citric acid, tartaric acid, oxalic acid, p-toluenesulfonic acid, hydrochloric acid, sulfuric acid, boric acid or mixtures thereof. Magnesium chloride, zinc chloride, magnesium sulfate and aluminum sulfate are preferably used.

Magnesium chloride is particularly preferred.

The catalyst B) is used in a concentration of from 0.1 to 10% by weight, preferably from 0.2 to 8% by weight, particularly preferably from 0.3 to 5% by weight, based on the impregnating agent A) and, if appropriate, C) and D).

In the process of the present invention, the impregnation can be carried out under the action of reduced pressure with subsequent action of superatmospheric pressure. The wood body is subjected to a reduced pressure of from 10 to 100 mbar for a period of from 10 minutes to 2 hours, preferably about 30 min, depending on the dimensions of the wood body and then flooded with the impregnating agent in an impregnating unit. A reduced pressure of about 50 mbar for about one hour has proven advantageous. Alternatively, however, the wood body can also first be flooded with the impregnating agent in the impregnating unit and then subjected to a reduced pressure of from 10 to 100 mbar for the abovementioned period.

Pressures of from 2 to 20 bar, preferably from 10 to 12 bar, are then applied, depending on the dimensions of the wood body, over a period of from 10 minutes to 2 hours, preferably about one hour. The vacuum pressure process is particularly expedient in combination with high proportions by weight of the impregnating agent.

After the pressure phase, the residual liquid is removed and the impregnated wood body is fixed and is predried at a temperature of from 20° C. to 40° C. Predrying means that the wood body is dried below the fiber saturation point, which, depending on the type of wood, is about 30% by weight. This predrying counteracts the danger of cracking. In the case of wood bodies of small size, for example veneers, the predrying can be dispensed with. In the case of wood bodies having larger dimensions, however, the predrying is always expedient.

The impregnating agent introduced into the wood is caused to react with itself and with the wood preferably with application of a temperature of from about 70° C. to 170° C., preferably from 80° C. to 150° C., over a period of from 10 min to 72 hours. The reaction of the impregnating agent may take place in particular at about 120° C. for a duration of about 12 hours. Consequently, not only are the pores in the wood filled with the impregnating agent, but crosslinking between impregnating agent and the wood itself occurs. In the case of veneers, higher temperatures and shorter times can more easily be used.

By means of the novel process, so to speak, a novel material is produced, in which the proportion of wood to the proportion of the impregnating agent is of the order of magnitude of about 1:0.3 to 1. The weight of the novel material is greater than the weight of the untreated wood by about 30% to 100%. The material has useful improved technical properties which can be used in practice and yet the appealing appearance of wood. The surface hardness is increased about 2- to 3-fold. Brinell hardnesses in the range from 80 to 100 $N/mm^2$ are achievable, for example, in the case of beech, whereas untreated beech has a Brinell hardness of about 30 to 37 $N/mm^2$. In addition, the formaldehyde emissions compared with wood which was crosslinked with conventional urea/formaldehyde resins are considerably reduced, which is of interest especially for interior use. Thus, new fields of use, in particular the entire wood parquet sector, have been opened up. A material which is easy to care for, long-lasting and usable in high load classes is provided. Furthermore, the susceptibility to changing climatic conditions, in particular humidity, is reduced.

In a particular embodiment, the impregnated and predried wood body is held firmly by means of a heatable press for fixing. It is thus possible in a simple manner to counteract the warping of the wood body and at the same time to carry out the hardening process of the impregnating agent. Here, a relatively low pressure is employed so that the surface structure of the wood body is preserved.

USE EXAMPLE 1

According to this use example, the top layers of a complete parquet were treated. The top layers may consist of beech, and other impregnated wood types are also possible. The process steps are possible in a similar manner also for the production of a one-layer parquet, or floorboards and also from other wood types.

1.) A 50% strength aqueous solution of a DMDHEU modified with diethylene glycol and methanol (mDMDHEU) was mixed with 1.5% of $MgCl_2.6H_2O$. The saw-rough lamellae of the top layer which were dried to about 12% wood moisture content were introduced into an impregnating unit. The impregnating unit was subjected to a reduced pressure of 100 mbar absolute for 30 minutes and then flooded with the impregnating agent. A pressure of 10 bar was then applied for one hour. The pressure phase was terminated and the residual liquid was removed.

2.) The impregnated lamellae of the top layer were fixed in stacks so that warping was made impossible. The lamellae were dried for about 7 days at a temperature of 40° C.

The reaction between the wood and the impregnating agent to give the composite material was effected by introducing the lamellae into a heatable press. The press was heated to 130° C. and the lamellae were pressed at 0.9 $N/mm^2$. The duration of the action of the temperature was dependent on the type of wood and the dimensions of the lamellae. In the case of from 4 to 5 mm thick lamellae, the reaction time was about 1 hour.

After the lamellae have cooled, they can be further processed in the same way as untreated lamellae. The lamellae had the dimensions 500 mm×100 m×4 mm.

Formaldehyde Content:

The formaldehyde content of the timbers was measured by the bottle method based on EN 717 Part 4.

TABLE 1

| Wood | Treatment | Formaldehyde content | Improvement |
|---|---|---|---|
| Beech lamellae | 30% DMDHEU; 1.5% MgCl$_2$• 6H$_2$O | 28.27* | |
| Beech lamellae | 30% mDMDHEU; 1.5% MgCl$_2$• 6H$_2$O | 9.69* | 66% |

*The concentration is stated in mg of formaldehyde per 100 g of wood.

The wood bodies treated with modified DMDHEU had a very greatly reduced formaldehyde content compared with the wood bodies treated with conventional DMDHEU.

| Wood | Brinell hardness | Improvement |
|---|---|---|
| Untreated | 35 N/mm$^2$ | |
| Treated | 73 N/mm$^2$ | 109% |

The surface hardness was very greatly increased by this process. The measurement was effected on the basis of EN 1534.

USE EXAMPLE 2

The aim of this use example is to produce a solid pinewood panel which is assembled from lamellae having dimensions of 500 mm×30 mm×30 mm.

A DMDHEU modified with diethylene glycol and methanol (mDMDHEU) was diluted to 30% by weight with water and mixed with 1.5% by weight of MgCl$_2$.6H$_2$O. The saw-rough lamellae dried to about 12% wood moisture content were introduced into an impregnating unit, flooded with the impregnating agent and subjected for 30 minutes to a reduced pressure of 40 mbar absolute. A pressure of 10 bar was then applied for 2 hours. The pressure phase was terminated and the residual liquid was removed. The lamellae were dried by fixing them in stacks so that warping was made impossible. Drying over a period of 15 days at room temperature was effected. It is also possible to use a conventional drying chamber and elevated temperature in order to shorten the predrying time.

The lamellae were heated to about 105° C. under circulated air while maintaining their fixing. The duration of action of the temperature is dependent on the type of wood and the dimensions of the lamellae. In the case of 3 cm thick lamellae, the reaction time was 48 hours. After the lamellae have cooled, they can be glued to give the panel in the same way as untreated solid wood parts.

Formaldehyde Content:

The formaldehyde content of the timbers was measured by the bottle method based on EN 717 Part 4.

TABLE 2

| Wood | Treatment | Formaldehyde content | Improvement |
|---|---|---|---|
| Pine sapwood lamellae | 30% DMDHEU; 1.5% MgCl$_2$• 6H$_2$O | 19.11* | |
| Pine sapwood lamellae | 30% mDMDHEU; 1.5% MgCl$_2$• 6H$_2$O | 7.91* | 59% |

*The concentration is stated in mg of formaldehyde per 100 mg of wood.

The wood bodies treated with modified DMDHEU had a very greatly reduced formaldehyde content compared with the wood bodies treated with conventional DMDHEU.

| Wood | Brinell hardness | Improvement |
|---|---|---|
| Untreated | 16 N/mm$^2$ | |
| Treated | 30 N/mm$^2$ | 88% |

The surface hardness was very greatly increased by this process. The measurement was effected on the basis of EN 1534.

We claim:

1. A process for the production of a wood body, comprising impregnating an untreated wood body with an aqueous solution of
    A) an impregnating agent selected from the group consisting of a reaction product of 1,3-bis(hydroxymethyl)-4,5-dihydroxyimidazolidin-2-one with a C$_{1-5}$-alcohol selected from the group consisting of methanol, ethanol, n-propanol, isopropanol, n-butanol, and n-pentanol, or a polyol selected from the group consisting of ethylene glycol, diethylene glycol, 1,2- and 1,3-propylene glycol, 1,2-, 1,3- and 1,4-butylene glycol, glycerol, and polyethylene glycols of the formula HO(CH$_2$CH$_2$O)$_n$H, where n is from 3 to 20 and mixtures thereof, and
    B) a catalyst selected from the group consisting of ammonium salts, metal salts, organic acids, inorganic acids and mixtures thereof, and
    drying and then hardening at elevated temperature.

2. The process according to claim 1, wherein an impregnating agent C) selected from the group consisting of 1,3-bis(hydroxymethyl)-4,5dihydroxyimidazolidin-2-one, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea and mixtures thereof is concomitantly used.

3. The process according to claim 1, wherein an impregnating agent D) selected from the group consisting of a C$_{1-5}$-alcohol, a polyol and mixtures thereof is concomitantly used.

4. The process according to claim 3, wherein methanol, ethanol, n-propanol, isopropanol, n-butanol, n-pentanol, ethylene glycol, diethylene glycol, 1,2- and 1,3-propylene glycol, 1,2-, 1,3- and 1,4-butylene glycol, glycerol, polyethylene glycols of the formula HO(CH$_2$CH$_2$O)$_n$H, where n is from 3 to 20, or mixtures thereof are concomitantly used.

5. The process according to claim 4, wherein methanol, diethylene glycol or a mixture thereof is concomitantly used.

6. The process according to claim 1, wherein the impregnating agents A) and, optionally, C) and D) are used in a concentration of from 1 to 60% by weight in the aqueous solution.

7. The process according to claim 1, wherein metal salts selected from the group consisting of metal halides, metal sulfates, metal nitrates, metal tetrafluoroborates, metal phosphates and mixtures thereof are used as catalyst B).

8. The process according to claim 7, wherein metal salts selected from the group consisting of magnesium chloride, magnesium sulfate, zinc chloride, lithium chloride, lithium bromide, boron trifluoride, aluminum sulfate, aluminum chloride, zinc nitrate, sodium tetrafluoroborate and mixtures thereof are used as catalyst B).

9. The process according to claim 1, wherein ammonium salts selected from the group consisting of ammonium chloride, ammonium sulfate, ammonium oxalate, diammonium phosphate and mixtures thereof are used as catalyst B).

10. The process according to claim 1, wherein organic or inorganic acids selected from the group consisting of maleic acid, formic acid, citric acid, tartaric acid, oxalic acid, p-toluenesulfonic acid, hydrochloric acid, sulfuric acid, boric acid and mixtures thereof are used as catalyst B).

11. The process according to claim 1, wherein magnesium chloride is used as catalyst B).

12. The process according to claim 1, wherein the catalyst B) is used in a concentration of from 0.1 to 10% by weight, based on the amount of the impregnating agent A) and, optionally, C) and D).

13. The process according to claim 1, wherein the impregnated wood body is dried at a temperature of from 20 to 60° C.

14. The process according to claim 1, wherein the impregnated and dried wood body is hardened at a temperature of from 80 to 170° C.

15. The process according to claim 14, wherein the impregnated and dried wood body is hardened at a temperature of from 90 to 150° C.

16. The process according to claim 1, wherein the impregnated and dried wood body is hardened over a period of from 10 min to 72 hours.

17. The process according to claim 1, wherein, after the impregnation and drying, the wood body is fixed so that a change in the shape of the wood body during the hardening is counteracted.

18. The process according to claim 17, wherein the wood body is fixed in a heatable press.

19. A wood body, obtained by the process according to claim 1.

20. A process for the production of a wood body, comprising impregnating an untreated wood body with an aqueous solution consisting of A) an impregnating agent selected from the group consisting of a reaction product of 1,3-bis(hydroxymethyl)-4,5-dihydroxyimidazolidin-2-one with a $C_{1-5}$-alcohol selected from the group consisting of methanol, ethanol, n-propanol, isopropanol, n-butanol, and n-pentanol, or a polyol selected from the group consisting of ethylene glycol, diethylene glycol, 1,2- and 1,3-propylene glycol, 1,2-, 1,3- and 1,4-butylene glycol, glycerol, and polyethylene glycols of the formula $HO(CH_2CH_2O)_nH$, where n is from 3 to 20, and mixtures thereof;

B) a catalyst selected from the group consisting of ammonium salts, metal salts, organic acids, inorganic acids and mixtures thereof, C) an impregnating agent selected from the group consisting of 1,3-bis(hydroxymethyl)-4,5-dihydroxyimidazolidin-2-one, 1,3-dimethyl-4,5-dihydroxyimidazolidin-2-one, dimethylolurea, bis(methoxymethyl)urea, tetramethylolacetylenediurea, 1,3-bis(hydroxymethyl)imidazolidin-2-one, methylolmethylurea and mixtures thereof, D) a $C_{1-5}$-alcohol selected from the group consisting of methanol, ethanol, n-propanol, isopropanol, n-butanol and n-pentanol, or a polyol selected from the group consisting of ethylene glycol, diethylene glycol, 1,2- and 1,3-propylene glycol, 1,2-, 1,3- and 1,4-butylene glycol, glycerol and polyethylene glycols of the formula $HO(CH_2CH_2O)_nH$, where n is from 3 to 20, or mixtures thereof; and water, and drying and then hardening at elevated temperature.

21. A wood body, obtained by the process according to claim 20.

22. The process according to claim 1, wherein the impregnating agent A) is a reaction product of 1,3-bis(hydroxymethyl)-4,5-dihydroxyimidazolidin-2-one with methanol.

23. The process according to claim 1, wherein the impregnating agent A) is a reaction product of 1,3-bis(hydroxymethyl)-4,5-dihydroxyimidazolidin-2-one with diethylene glycol.

24. The process according to claim 1, wherein the impregnating agent A) is a reaction product of 1,3-bis(hydroxymethyl)-4,5-dihydroxyimidazolidin-2-one with a mixture of methanol and diethylene glycol.

* * * * *